United States Patent

[11] 3,625,947

| [72] | Inventors | Tamehiko Noguchi<br>Tokyo;<br>Mitsukuni Sumitani, Soka-shi; Kenkichi<br>Tsukamoto, Yono-shi; Daisaku Matsunaga,<br>Urawa-shi, all of Japan |
|---|---|---|
| [21] | Appl. No. | 699,802 |
| [22] | Filed | Jan. 23, 1968 |
| [45] | Patented | Dec. 7, 1971 |
| [73] | Assignee | Nippon Kayaku Kabushiko Kaisha<br>Tokyo, Japan |
| [32] | Priorities | Jan. 30, 1957 |
| [33] | | Japan |
| [31] | | 42/5573;<br>Feb. 3, 1967, Japan, No. 42/6590; May 10,<br>1967, Japan, No. 42/29111; Sept. 2, 1967,<br>Japan, No. 42/56084 |

[54] N HETEROCYCLIC ETHYL NAPHTHALIMIDES
6 Claims, No Drawings

[52] U.S. Cl. .................................................... 260/281,
8/55, 252/301.2 W, 26/37 NP, 260/247.5,
260/293 D, 260/296 R, 260/309, 260/326.85,
260/487, 260/561 AL, 260/583 P

[51] Int. Cl. ......................................................... C07d 39/00
[50] Field of Search ........................................... 260/281

[56]  References Cited
UNITED STATES PATENTS

| 3,310,564 | 3/1967 | Kasai ............................. | 260/281 |
|---|---|---|---|
| 3,330,834 | 7/1967 | Senshu .......................... | 260/281 |

FOREIGN PATENTS

| 24910 | 10/1965 | Japan ............................ | 260/281 |
|---|---|---|---|
| 14988 | 7/1964 | Japan ............................ | 260/281 |
| 21127 | 11/1964 | Japan ............................ | 260/281 |

*Primary Examiner*—Donald G. Daus
*Attorney*—Birch, Swindler, McKie & Beckett

ABSTRACT: The present invention is directed to novel naphthalimide derivatives which have been quaternized or made into a salt form and a method for preparing the same. The present compound is used in fluorescent whitening of various synthetic fibers, particularly polyacrylonitrile fibers.

N HETEROCYCLIC ETHYL NAPHTHALIMIDES

This invention relates to a novel naphthalimide having the following general formula,

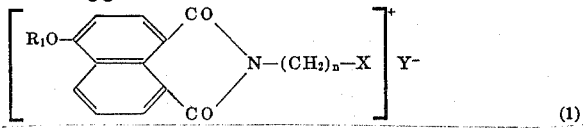
(1)

wherein $R_1$ represents an alkyl group or an alkyl group substituted with hydroxyl group, alkoxy group, phenoxy or phenyl group; $n$ represents an integer of 2 or 3; X represents a substituent group of (1)

wherein $R_2$ and $R_3$ represent the same or different alkyl groups, substituted alkyl group or alicyclic group, or $R_2$ and $R_3$ represent a ring formed by connecting each with other together with an amino group nitrogen, and $R_4$ represents a hydrogen atom or residual group of quaternizing agent, or (2)

wherein $R_4$ represents a hydrogen atom or residual group of quaternizing agent and $R_5$ represents a hydrogen atom or alkyl group, or (3)

wherein $R_4$ represents a hydrogen atom or residual group of quaternizing agent and $R_6$ represents an alkyl group, phenyl group, or substituted phenyl group; and Y represents an anion.

The present naphthalimide derivative is used in the fluorescent whitening of various synthetic fibers such as polyvinyl alcohol polyamide fibers, and polyacrylonitrile fibers, and semisynthetic fibers such as cellulose acetate more particularly used in the fluorescent whitening of polyacrylonitrile fibers.

Alkoxynaphthalimide derivatives have been heretofore used as a fluorescent whitening agent and their excellent whitening effect on the polyester synthetic fibers and polyacrylonitrile fibers has been widely recognized (U.S. Pat. No. 3,310,564). However, these compounds are sparingly soluble in water, and thus to disperse these compounds into water, a dispersing agent must been used. Further, when the thus dispersed compounds are applied to the polyacrylonitrile fibers, their adsorption ratio is low, the whiteness effect is low, and the various fastnesses of whitened article are not sufficiently good.

As a result of the studies on the present compound as shown in the above general formula 1, the present inventors found that said various disadvantages can be eliminated by using the present compounds. That is, the present compound as shown in the above general formula 1 is very readily soluble in water and requires no dispersion treatment using a dispersing agent when applied. Further, the adsorption ratio is much improved, so the loss of the compound itself into the both can be prevented after the treatment. Furthermore, the whitening effect is considerably improved. It is also notable that the various fastnesses of the cloth whitened with the compound as shown in the above general formula 1, particularly the light fastnesses, the most important property required for the fluorescent whitening agent, are remarkably improved, as compared with the cloth treated with conventional compound that has not been quaternized or made into a salt form.

The compound as shown in the above general formula 1 is prepared in the following manners:

1. Naphthalic acid-4-sulfonic acid, its anhydride or their salt is subjected to condensation reaction with an amine as represented by the following general formula 2, 3 or 4,

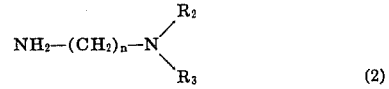
(2)

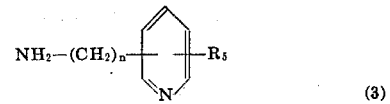
(3)

or

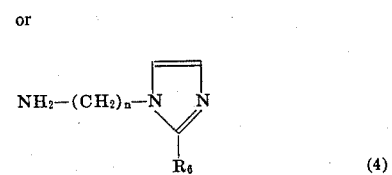
(4)

wherein $n$, $R_2$, $R_3$, $R_5$ and $R_6$ have the same meanings as defined above, whereby naphthalimide-4-sulfonic acid or its salt represented by the following general formula 5, 6 or 7 is obtained correspondingly,

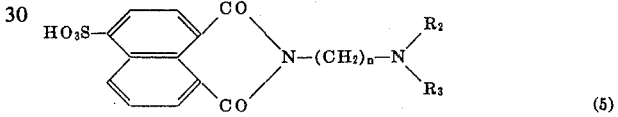
(5)

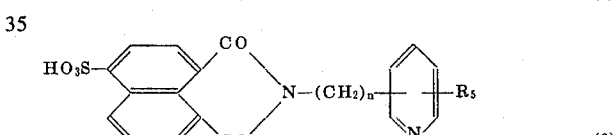
(6)

or

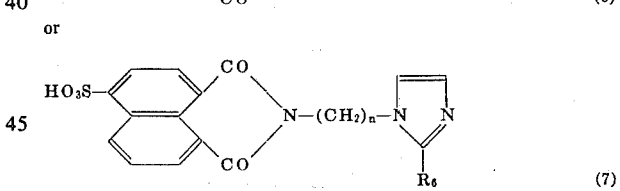
(7)

wherein $R_2$, $R_3$, $R_5$, $R_6$ and $n$ have the same meaning as defined above.

The resulting compound is then subjected to reaction with an alcohol as represented by the following general formula 8, or its alcoholate $$R_1 13 \text{ OH} \quad 8$$

in the presence of a condensing agent, whereby compound as represented by the following general formula 9, 10 or 11 is obtained correspondingly,

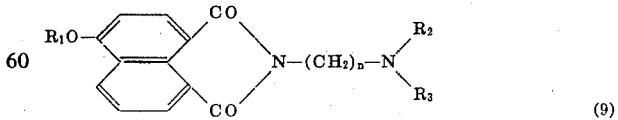
(9)

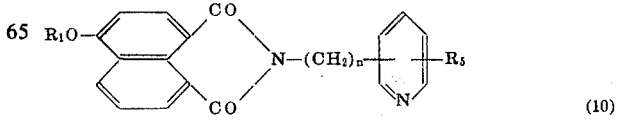
(10)

or

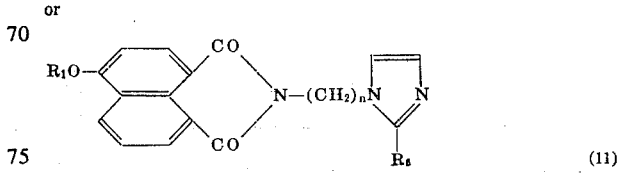
(11)

wherein $R_1$, $R_2$, $R_3$, $R_5$, $R_6$ and $n$ have the same meaning as defined above.

In the present condensation reaction, an alkaline condensing agent is generally used as a condensing agent, but the particularly preferable condensing agent is a hydroxide of alkali metal, such as sodium hydroxide or potassium hydroxide. The present condensation reaction can be favorably carried out when the alcohol as represented by the above general formula 8 is used as a diluent, but sometimes the condensation reaction can be also carried out in a suitable inert solvent. The necessary reaction temperature and reaction time vary depending upon the kind of alcohol and the kind and quantity of alkali used. The reaction can be generally carried out at a temperature of 50° to 150° C.

Then, the resulting condensation compound is treated with a quaternizing agent or is subjected to addition reaction with a known inorganic or organic acidic compound capable of forming a salt with the amine as represented by the general formula 9, 10 or 11, whereby the compound represented by the general formula 1 is obtained.

II. The compound as represented by the general formula (1) can be also prepared in the following manner:

4-hydroxynaphthalic acid, its anhydride, or their salt is subjected to reaction with an alkylating agent such as dialkyl sulfate, p-toluenesulfonic acid alkyl ester, etc. according to the conventional method, whereby 4-alkoxynaphthalic acid anhydride as represented by the following general formula 12 is obtained,

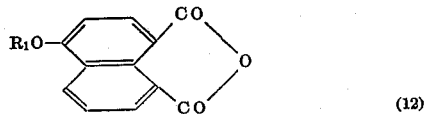

(12)

wherein $R_1$ has the same meaning as defined above. The resulting 4-alkoxynaphthalic acid anhydride is subjected to reaction with an amine as represented by the above general formula 2, 3 or 4, whereby the compound as represented by the above general formula 9, 10 or 11 can be obtained. Then, the resulting compound is quaternized or made into a salt form in the same manner as in I, whereby the desired compound is obtained.

The compound as represented by the above general formula 2 and used in the synthesis includes di-substituted aminoalkylamine such as β-dimethyaminoethylamine, β-diethylaminoethylamine, β-diisopropylaminoethylamine, β-di-n-amylaminoethylamine, β-diethanolamineothylamine, β-ethylethanolaminoethylamine, β-methyl-n-propylaminoethylamine, β-cyclopentyl-methylaminoethylamine, γ-dimethylaminopropylamine, γ-diethylaminopropylamine, γ-di-n-butylaminopropylamine, and γ-cyclohexylmethylaminopropylamine, and further includes morpholinoethylamine, morpholinopropylamine, piperidinoethylamine, piperidinopropylamine, pipecolinopropylamine, piperidinoethylamine, pyrrolidinoethylamine, pyrrolinoethylamine, etc.

The compound as represented by the general formula 3 includes 2-β-aminoethylpyridine, 4-β-aminoethylpyridine, 2-β-aminoethyl-5-ethylpyridine, 3-β-aminoethyl-6-methylpyridine, etc.

The compound as represented by the above general formula 4 includes 1-γ-aminopropyl-2-ethylimidazole, 1-γ-aminopropyl-2-methylimidazole, 1-β-aminoethyl-2-ethylimidazole, 1-γ-aminopropyl-2-phenylimidazole, 1-(β-aminoethyl)-2-methylimidazole, etc.

The alcohol as represented by the above general formula 8 includes methanol, ethanol, n-propanol, i-propanol, n-butanol, i-butanol, tert.-butanol, n-amylalcohol, i-amylalcohol, benzylalcohol, β-phenylethylalcohol, γ-phenylpropylalcohol, ethylene glycol, propylene glycol, ethylene glycol monobutylether, ethylene glycol monomethylether, ethylene glycol monoethylether, ethylene glycol monophenylether, propylene glycol monomethylether, propylene glycol monophenylether, etc.

The quaternizing agent used in quaternizing the compound as represented by the above general formula 9, 10 or 11 includes alkyl halide such as methyl chloride, methyl iodide, ethyl iodide, methyl bromide, ethyl bromide, propyl bromide, n-butyl bromide, isobutyl bromide, dodecyl bromide, etc.; aralkyl halide such as benzyl chloride, etc.; α-halocarboxylic acid derivative or β-halocarboxylic acid derivative such as chloroacetamide, ethylchloroacetate, β-chloropropionamide, ethyl β-chloropropionate, β-bromopropionamide, ethyl β-bromopropionate, etc.; dialkylsulfate such as dimethylsulfate, diethylsulfate, etc.; arylsulfonic acid alkyl ester such as benzenesulfonic acid methyl ester, toluenesulfonic acid methyl ester, toluenesulfonic acid ethyl ester, toluenesulfonic acid n-butyl ester, etc.; alkylsulfonic acid alkyl ester such as methanesulfonic acid methyl ester, butanesulfonic acid ethyl ester, etc.; acid halide such as methanesulfonyl chloride, ethanesulfonyl chloride, butanesulfonyl chloride, toluenesulfonyl chloride, acetyl chloride, etc.; and aliphatic sultone such as propanesultone, butanesultone, etc., and haloamine such as chloramine etc.

The acidic compound used in the formation of a salt of the compound as represented by the general formula 9, 10 or 11 includes inorganic acid such as hydrochloric acid, hydrobromic acid, hydriodic acid, sulfuric acid, phosphoric acid, perchloric acid, periodic acid, etc., and organic acid such as benzenesulfonic acid, toluenesulfonic acid, xylenesulfonic acid, phenolsulfonic acid, naphthalenesulfonic acid, naphthalenedisulfonic acid, naphthalenetrisulfonic acid, formic acid, acetic acid, monochloroacetic acid, dichloroacetic acid, trichloroacetic acid, etc.

The present compound as represented by the general formula 1 is readily soluble in water, and clearly whitened cloth of polyacrylonitrile fibers having a high light fastness can be obtained by treating said cloth in an acidic bath containing the present compound. In treating the polyacrylonitrile fibrous material the material may be optically whitened by treating the same with the compound as represented by the general formula 1, after bleaching the same with a bleaching agent such as sodium chlorite at first and then dechlorinating the bleached material with sodium bisulfite, or the material may be optically whitened by simultaneously using the compound as represented by the general formula 1 and a bleaching agent such as sodium chlorite, or a suitable surface active agent or a dyeing assistant. Further, it is also possible to prepare the fluorescently whitened filaments by directly adding the present compound to the polyacrylonitrile spinning solution. Furthermore, a remarkable whitening effect can be also obtained when the present compound is used in the fluorescent whitening of the synthetic resin or plastics containing polyacrylonitrile.

The amount of the present naphthalimide compound used in the whitening can be varied in a wide range, depending upon the desired whiteness and the material to be whitened, but actually a remarkable whitening effect can be obtained even when 0.01–0.5 percent by weight of the present naphthalimide compound is used.

The following examples are given merely as illustrative of the present invention and are not to be considered as limiting. In the examples, part and percentage are by weight.

EXAMPLE 1

Thirty parts of sodium naphthalic acid-4-sulfonate are added to a mixture consisting of 166 parts of water and 18.4 parts of 1-γ-aminopropyl-2-ethylimidazole and subjected to reaction for 3 hours at 90° C. After the completion of the reaction, the resulting product mixture is weakly acidified with hydrochloric acid, and the resulting deposited white crystals are filtered off, washed with water and dried, whereby a compound as represented by the following formula 13 is obtained.

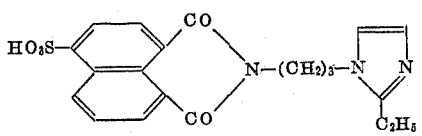

(13)

Ten parts of the thus obtained compound are added to a mixture consisting of 150 parts of methanol and 15 parts of caustic soda and subjected to reaction for 2 hours under reflux. After the completion of the reaction, the resulting product mixture is put into 600 parts of water, and the resulting deposited crystals are filtered off, washed with water and dried, whereby a compound as represented by the following formula 14 is obtained.

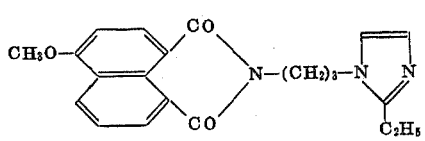

(14)

Yellow, needlelike crystals having a melting point of 88°–92° C. are obtained by recrystallizing the resulting compound in benzene.

3.6 parts of the compound as represented by the formula 14 are dissolved in 30 parts of toluene, and 1.6 parts of diethylsulfate are thereto added. The mixture is subjected to reaction for 4 hours under reflux. After the completion of the reaction, the deposited precipitate is filtered off, washed with acetone and dried, whereby a compound having a melting point of 206°–208° C. as represented by the following formula 15 is obtained.

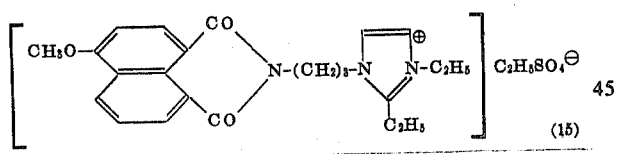

(15)

When 10 parts of the compound as represented by the formula 14 are suspended in 50 parts of ethanol, 10 parts of concentrated hydrochloric acid are added thereto and the resulting mixture is left at room temperature for 1 hour, the crystals are deposited. The resulting crystals are filtered off, washed with acetone and dried, whereby a compound having a melting point (decomposition of 231° C. as represented by the following formula 16 is obtained.

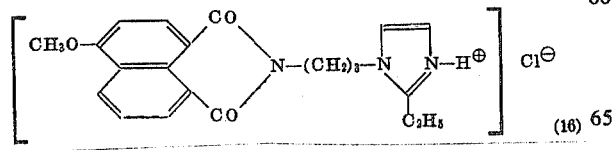

(16)

EXAMPLES 2–49

Sodium naphthalic acid-4-sulfonate is imidized with the amine as represented by the general formula 2, 3 or 4 and shown in the following table 1, then subjected to reaction with alcohol as represented by the general formula 8 and quaternized with a quaternizing agent or made into a salt form with an acidic compound according to the same procedure as described in example 1.

TABLE 1

| Ex. No. | Alcohol as represented by the formula (8) | Amine compound as represented by formula (2), (3) or (4) | Quaternizing agent or acidic compound | Product | Melting point (°C.) | Ultraviolet adsorption maximum wavelength max (mμ, water) | Fluorescence maximum wavelength, $Fl_{max}$ (mμ, water, xenon 365 mμ) |
|---|---|---|---|---|---|---|---|
| 2 | $CH_3OH$ | $NH_2(CH_2)_3N\begin{smallmatrix}CH_3\\CH_3\end{smallmatrix}$ | $HClO_4$ | [$H_3CO$-naphthalimide-$N(CH_2)_3$-$N^⊕(CH_3)_2H$] $ClO_4^⊖$ | 195–196 | 378 | 468 |
| 3 | Same as above | Same as above | $ClCH_2COOH$ | [$H_3CO$-naphthalimide-$N(CH_2)_3$-$N^⊕(CH_3)_2H$] $ClCH_2COO^⊖$ | 68 | 378 | 468 |
| 4 | do | do | $CH_3COOH$ | [$H_3CO$-naphthalimide-$N(CH_2)_3$-$N^⊕(CH_3)_2H$] $CH_3COO^⊖$ | 113–145 | 378 | 468 |

| Ex. No. | Alcohol as represented by the formula (8) | Amine compound as represented by formula (2), (3) or (4) | Quaternizing agent or acidic compound | Product | Melting point (°C.) | Ultraviolet absorption maximum wavelength max (mµ, water) | Fluorescence maximum wavelength Flmax. (mµ, water, xenon, 365 mµ) |
|---|---|---|---|---|---|---|---|
| 5 | ...do... | ...do... | H₂SO₄ | | ² 126–127 | 378 | 468 |
| 6 | ...do... | NH₂(CH₂)₃N(C₂H₅)₂ | HCl | | ² 235 | 378 | 468 |
| 7 | n-C₃H₇OH | NH₂(CH₂)₃N(CH₃)₂ | HCl | | ² 217 | 380 | 472 |
| 8 | CH₃OH | NH₂(CH₂)₃N(piperazine CH₂CH₂NH CH₂CH₂) | HO₃S-C₆H₄-CH₃ | | 160.5–162 | 378 | 468 |
| 9 | Same as above | NH₂(CH₂)₃N(CH₃)₂ | CH₃O₃S-C₆H₄-CH₃ | | 234–235 | 377 | 468 |
| 10 | ...do... | Same as above | CH₃I | | ² 263–265 | 378 | 468 |
| 11 | ...do... | ...do... | C₂H₅I | | 244–245 | 378 | 468 |
| 12 | H₃COC₂H₄OH | ...do... | Same as above | | 170–172 | 376 | 466 |

| Ex. No. | Alcohol as represented by the formula (8) | Amine compound as represented by formula (2), (3) or (4) | Quaternizing agent or acidic compound | Product | Melting point (°C.) | Ultraviolet absorption maximum wavelength max (mµ, water) | Fluorescence maximum wavelength, Fl$_{max}$ (mµ, water, xenon, 365 mµ) |
|---|---|---|---|---|---|---|---|
| 13 | CH$_3$OH | NH$_2$(CH$_2$)$_3$N(CH$_2$CH$_2$)$_2$(CH$_2$CH$_2$) | CH$_3$O$_3$S-C$_6$H$_4$-CH$_3$ | | 173–175 | 378 | 468 |
| 14 | Same as above | NH$_2$(CH$_2$)$_3$N(CH$_2$CH$_2$)(CH$_3$)(CH$_2$CH$_2$)(CH$_3$) | Same as above | | 188–189 | 378 | 468 |
| 15 | do | NH$_2$(CH$_2$)$_3$N(CH$_3$)$_2$ | ClC$_2$H$_4$OCOCH$_3$ | | 235–238 | 378 | 465 |
| 16 | do | Same as above | ClC$_2$H$_4$O-C$_6$H$_5$ | | 237–240 | 378 | 468 |
| 17 | do | do | C$_2$H$_5$Br | | 209–210 | 378 | 468 |
| 18 | do | do | CH$_3$-C$_6$H$_4$-SO$_2$C$_2$H$_5$ | | 198–200 | 378 | 468 |
| 19 | do | do | CH$_3$-C$_6$H$_4$-SO$_3$C$_4$H$_9$ | | 178–179.5 | 378 | 468 |
| 20 | do | do | ClCH$_2$CONH$_2$ | | ²216 | 378 | 468 |

| Ex. No. | Alcohol as represented by the formula (8) | Amine compound as represented by formula (2), (3) or (4) | Quaternizing agent or acidic compound | Product | Melting point (°C.) | Ultraviolet absorption maximum wavelength max (mμ, water) | Fluorescence maximum wavelength, Fl max, xenon, water, 365 mμ |
|---|---|---|---|---|---|---|---|
| 21 | ..do.. | ..do.. | ClCH₂COOC₂H₅ | 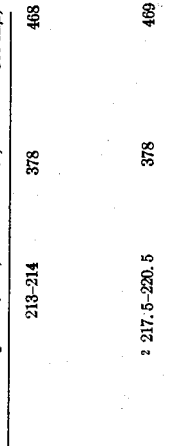 | 213–214 | 378 | 468 |
| 22 | ..do.. | ..do.. | p-CH₃-C₆H₄-SO₂Cl | 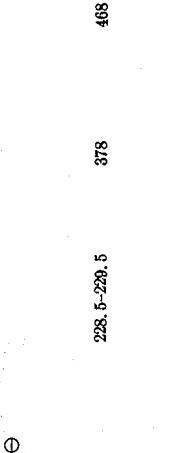 | ² 217.5–220.5 | 378 | 469 |
| 23 | ..do.. | ..do.. | CH₃COCl | 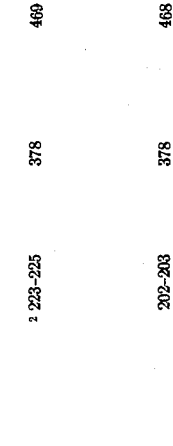 | 228.5–229.5 | 378 | 468 |
| 24 | ..do.. | ..do.. | C₂H₅SO₂Cl | 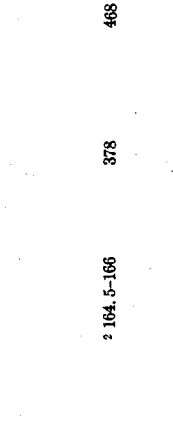 | ² 223–225 | 378 | 469 |
| 25 | ..do.. | ..do.. | n-C₄H₉Br | 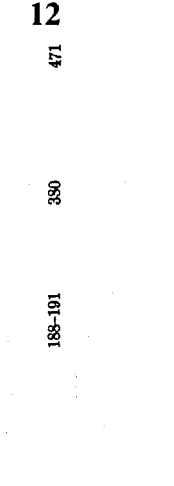 | 202–203 | 378 | 468 |
| 26 | ..do.. | ..do.. | C₆H₅-CH₂Cl | 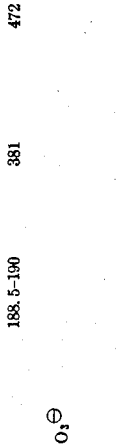 | ² 164.5–166 | 378 | 468 |
| 27 | n-C₃H₇OH | ..do.. | (C₂H₅)₂SO₄ | 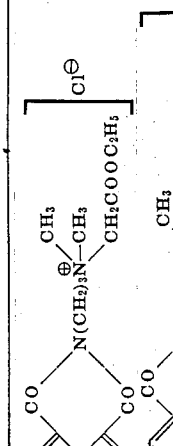 | 188–191 | 380 | 471 |
| 28 | n-C₄H₉OH | ..do.. | p-CH₃-C₆H₄-SO₃CH₃ | 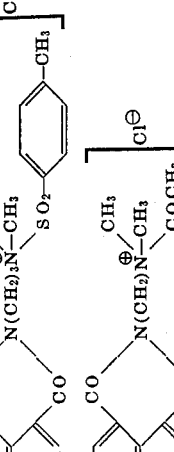 | 188.5–190 | 381 | 472 |

| Ex. No. | Alcohol as represented by the formula (8) | Amine compound as represented by formula (2), (3) or (4) | Quaternizing agent or acidic compound | Product | Melting point (°C.) | Ultraviolet absorption maximum wavelength max (mμ, water) | Fluorescence maximum wavelength, Fl$_{max}$ (mμ, water, xenon, 365 mμ) |
|---|---|---|---|---|---|---|---|
| 29 | CH$_3$OH | NH$_2$(CH$_2$)$_3$N(C$_2$H$_5$)(C$_2$H$_5$) | Same as above | | 164.5–166 | 378 | 468 |
| 30 | Same as above | Same as above | (C$_2$H$_5$)$_2$SO$_4$ | | 186–187 | 378 | 468 |
| 31 | do | NH$_2$(CH$_2$)$_3$N(n-C$_4$H$_9$)(n-C$_4$H$_9$) | CH$_3$—C$_6$H$_4$—SO$_3$CH$_3$ | | 123–125 | 378 | 468 |
| 32 | do | imidazoline-C$_2$H$_5$ NH$_2$(CH$_2$)$_3$N | HCl | | [2] 231 | 378 | 467 |
| 33 | do | Same as above | CH$_3$—C$_6$H$_4$—SO$_3$CH$_3$ | | 180–182 | 378 | 467 |
| 34 | do | do | n-C$_4$H$_9$Br | | 180–181 | 378 | 467 |
| 35 | do | do | CH$_3$SO$_2$Cl | | [2] 217–219 | 378 | 467 |
| 36 | do | do | H$_2$SO$_4$ | | 226–227 | 378 | 467 |

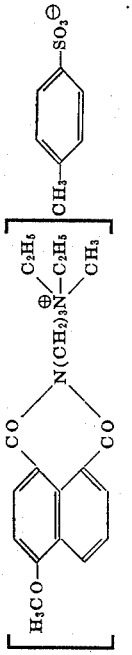
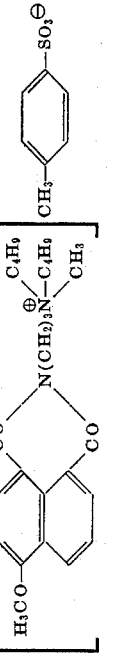
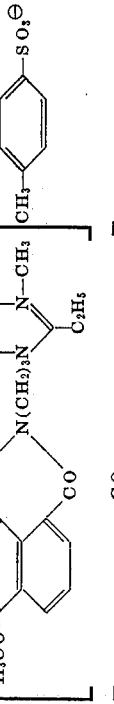
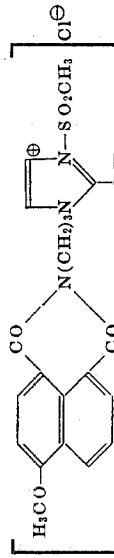
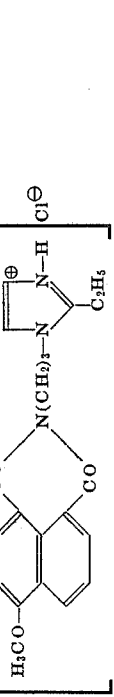
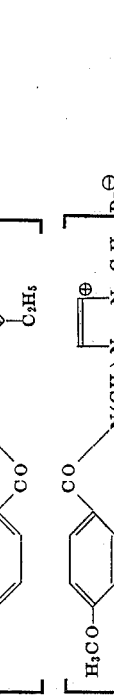
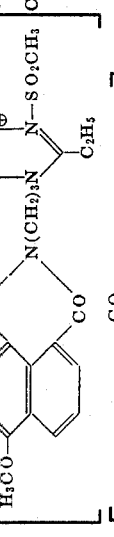
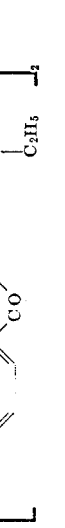
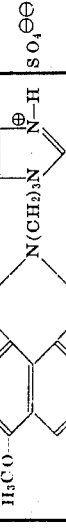

| Ex. No. | Alcohol as represented by the formula (8) | Amine compound as represented by formula (2), (3) or (4) | Quaternizing agent or acidic compound | Product | Melting point (°C.) | Ultraviolet absorption maximum wavelength max (mµ, water) | Fluorescence maximum wavelength, $F_{lmax}$ (mµ, water, xenon, 365 mµ) |
|---|---|---|---|---|---|---|---|
| 37 | do | do | $HClO_4$ | (structure) | 171–174 | 378 | 487 |
| 38 | do | do | $ClCH_2COOH$ | (structure) | (3) | 378 | 467 |
| 39 | $H_5C_2OC_2H_4OC$ | do | $CH_3$—⟨⟩—$SO_3CH_3$ | (structure) | 116–118 | 377 | 466 |
| 40 | ⟨⟩—$C_2H_4OH$ | $NH_2(CH_2)_3N\begin{smallmatrix}CH_3\\CH_3\end{smallmatrix}$ | Same as above | (structure) | 197–198 | 380 | 484 |
| 41 | Same as above | Same as above | $CH_3I$ | (structure) | 2 235 | 380 | 484 |
| 42 | do | do | $HCl$ | (structure) | 202–203 | 380 | 484 |
| 43 | do | do | $HClO_4$ | (structure) | 175–176 | 380 | 484 |
| 44 | do | $NH_2(CH_2)_2$—⟨N⟩ | $CH_3$—⟨⟩—$SO_3CH_3$ | (structure) | 174.5–176 | 380 | 488 |

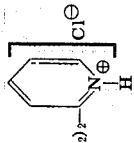

EXAMPLE 50

Twenty-one parts of 4-hydroxynaphthalic acid anhydride, 32 parts of anhydrous sodium carbonate, and 50 parts of dimethylsulfate are added to 250 parts of acetone and subjected to reaction for 6 hours under reflux. After the completion of the reaction 200 parts of aqueous 10 percent caustic soda solution are added to the resulting product mixture and then the mixture is left still overnight. The resulting white precipitate is filtered off and washed with acetone. The thus obtained crystals are boiled together with 800 parts of an aqueous 5 percent caustic soda solution for 3 hours. After the dissolution, the solution is neutralized with hydrochloric acid, and the deposited crystals are filtered off, washed with water and dried.

Twenty-three parts of the thus obtained 4-methoxynaphthalic acid anhydride are added to a mixture consisting of 24 parts of 2-($\beta$-aminoethyl)pryidine and 216 parts of water and subjected to reaction for 5 hours under reflux. After the completion of reaction, the resulting precipitate is filtered off, washed with water and dried, whereby a compound as represented by the following formula 17 is obtained.

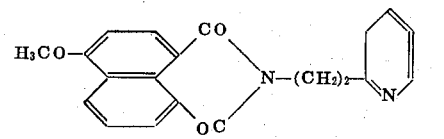

Light yellowish white, needlelike crystals having a melting point of 186.5°–187° C. is obtained by recrystallizing the resulting compound from methanol.

Ten parts of the compound as represented by the formula 17 is suspended in 100 parts of chlorobenzene, and then 8 parts of paratoluenesulfonic acid methyl ester are thereto added. Then, the reaction is continued for 3 hours under reflux. After the completion of the reaction, the resulting precipitate is filtered off, washed with acetone and dried, whereby a compound having a melting point of 176°–178° C. as represented by the following formula 18 is obtained.

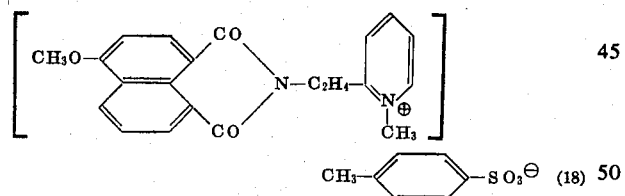

Ten parts of the compound as represented by the formula 17 is suspended in 50 parts of ethanol, and then 10 parts of concentrated hydrochloric acid are thereto added. The resulting solution is heated to dissolve said compound. After cooling, the deposited crystals are filtered off, washed with ethanol, and dried, whereby a compound as represented by the following formula 19 is obtained.

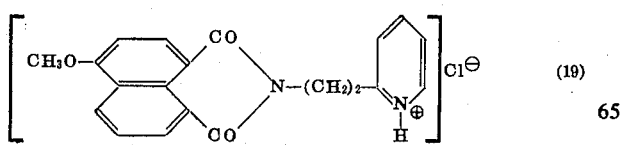

EXAMPLES 51–85

4-alkoxynaphthalic acid or its anhydride as represented by the formula 12 and obtained by alkylating 4-hydroxynaphthalic acid, its anhydride or its salt is imidized by amine as represented by the formula 2, 3 or 4 and shown in the following table 2, and then quaternized with a quaternizing agent or made into a salt form with an acidic compound in the same procedure as described in example 50.

TABLE 2

| Ex. No. | Alkylating agent | Amine compound as represented by formula (2), (3) or (4) | Quaternizing agent or acidic compound | Product | Melting point (° C.) | Ultraviolet adsorption maximum wavelength (mµ, water) | Fluorescence maximum wavelength, Fl$_{max}$ (mµ, water, xenon, 365 mµ) |
|---|---|---|---|---|---|---|---|
| 51 | $(CH_3)_2SO_4$ | $NH_2(CH_2)_3N\begin{smallmatrix}CH_3\\CH_3\end{smallmatrix}$ | $CH_3-\bigcirc-SO_3H$ | $H_3CO-[naphthalimide]-N(CH_2)_3N^{\oplus}(CH_3)_3-H\cdot[CH_3-C_6H_4-SO_3^{\ominus}]$ | 146–148 | 378 | 468 |
| 52 | Same as above | $NH_2(CH_2)_3N\begin{smallmatrix}C_2H_5\\C_2H_5\end{smallmatrix}$ | Same as above | $H_3CO-[naphthalimide]-N(CH_2)_3N^{\oplus}(C_2H_5)_2-H\cdot[CH_3-C_6H_4-SO_3^{\ominus}]$ | 143–144 | 378 | 468 |
| 53 | do | $NH_2(CH_2)_3N\begin{smallmatrix}CH_2-CH_2\\CH_2-CH_2\end{smallmatrix}O$ | $ClCH_2COOH$ | $H_3CO-[naphthalimide]-N(CH_2)_3N^{\oplus}\begin{smallmatrix}CH_2-CH_2\\CH_2-CH_2\end{smallmatrix}O-H\cdot[ClCH_2COO^{\ominus}]$ | 65 | 378 | 468 |

| Ex. No. | Alkylating agent | Amine compound as represented by formula (2), (3) or (4) | Quaternizing agent or acidic compound | Product | Melting point (°C.) | Ultraviolet adsorption maximum wavelength (mμ, water) | Fluorescence maximum wavelength, Fl$_{max}$ (mμ, water, xenon, 365 mμ) |
|---|---|---|---|---|---|---|---|
| 54 | do | Same as above | HCl | [H$_3$CO-naphthalimide-N(CH$_2$)$_3$-N$^⊕$(H)(CH$_2$CH$_2$)$_2$O] Cl$^⊖$ | 251–253 | 378 | 468 |
| 55 | do | NH$_2$(CH$_2$)$_3$N(CH$_2$CH$_2$)$_2$CH$_2$ | ClCH$_2$COOH | [H$_3$CO-naphthalimide-N(CH$_2$)$_3$-N$^⊕$(H)(CH$_2$CH$_2$)$_2$CH$_2$] ClCH$_2$COO$^⊖$ | 92–93 | 378 | 468 |
| 56 | do | Same as above | HCl | [H$_3$CO-naphthalimide-N(CH$_2$)$_3$-N$^⊕$(H)(CH$_2$CH$_2$)$_2$CH$_2$] Cl$^⊖$ | ² 215 | 378 | 468 |
| 57 | do | NH$_2$(CH$_2$)$_3$-N(CH$_2$CH$_2$)$_2$CH$_2$ | p-CH$_3$C$_6$H$_4$SO$_3$H | [H$_3$CO-naphthalimide-N(CH$_2$)$_3$-N$^⊕$(CH$_2$)(CH$_2$CH$_2$)$_2$CH$_2$] p-CH$_3$C$_6$H$_4$SO$_3$$^⊖$ | 194 | 378 | 468 |
| 58 | do | NH$_2$(CH$_2$)$_3$-N(CH$_2$CH$_2$)$_2$CHCH$_3$ | ClCH$_2$COOH | [H$_3$CO-naphthalimide-N(CH$_2$)$_3$-N$^⊕$(H)(CH$_2$CH$_2$)$_2$CHCH$_3$] ClCH$_2$COO$^⊖$ | 143–144 | 378 | 468 |
| 59 | do | Same as above | HCl | [H$_3$CO-naphthalimide-N(CH$_2$)$_3$-N$^⊕$(H)(CH$_2$CH$_2$)$_2$CHCH$_3$] Cl$^⊖$ | 214–216 | 378 | 468 |
| 60 | do | do | p-CH$_3$C$_6$H$_4$SO$_3$H | [H$_3$CO-naphthalimide-N(CH$_2$)$_3$-N$^⊕$(CH$_3$)(CH$_2$CH$_2$)$_2$CHCH$_3$] p-CH$_3$C$_6$H$_4$SO$_3$$^⊖$ | 198–199 | 378 | 468 |
| 61 | do | NH$_2$(CH$_2$)$_3$N(CH$_3$)$_2$ | (CH$_3$)$_2$SO$_4$ | [H$_3$CO-naphthalimide-N(CH$_2$)$_3$-N$^⊕$(CH$_3$)$_3$] CH$_3$SO$_4$$^⊖$ | ² 258–260 | 378 | 46 |

| Ex. No. | Alkylating agent | Amine compound as represented by formula (2), (3) or (4) | Quaternizing agent or acidic compound | Product | Melting point (°C.) | Ultraviolet adsorption maximum wavelength (mμ, water) | Fluorescence maximum wavelength, Fl max. (mμ, water, xenon, 365 mμ) |
|---|---|---|---|---|---|---|---|
| 62 | do | NH₂(CH₂)₂N(C₂H₅)(C₂H₅) | Same as above | (structure) | 112–120 | 377 | 468 |
| 63 | do | NH₂(CH₂)₃N(CH₃)(CH₃) | (propane sultone) | (structure) | ²261–262 | 378 | 468 |
| 64 | do | NH₂(CH₂)₂N(C₂H₅)(C₂H₅) | CH₃—C₆H₄—SO₃CH₃ | (structure) | 149–150.5 | 378 | 468 |
| 65 | do | NH₂(CH₂)₃N(morpholino) | (CH₃)₂SO₄ | (structure) | 130 | 379 | 468 |
| 66 | do | NH₂(CH₂)₂N(CH₃)(CH₃) | n—C₃H₇Br | (structure) | 187–188 | 378 | 468 |
| 67 | do | Same as above | CH₃SO₂Cl | (structure) | ²218–220 | 378 | 469 |
| 68 | do | do | (C₂H₅)₂SO₄ | (structure) | 216–217 | 378 | 468 |
| 69 | CH₃—C₆H₄—SO₃C₃H₇ | do | CH₃—C₆H₄—SO₃CH₃ | (structure) | 205.5–206.5 | 380 | 471 |

| Ex. No. | Alkylating agent | Amine compound as represented by formula (2), (3) or (4) | Quaternizing agent or acidic compound | Product | Melting point (°C.) | Ultraviolet adsorption maximum wavelength (mµ, water) | Fluorescence maximum wavelength, Fl$_{max.}$ (mµ, water, xenon, 365 mµ) |
|---|---|---|---|---|---|---|---|
| 70 | CH$_3$-⌬-SO$_3$CH$_3$ | NH$_2$(CH$_2$)$_3$-N(CH$_2$CH$_2$)$_2$CH$_2$CH$_2$ | C$_2$H$_5$I | (structure) | [2] 228.5–224.5 | 378 | 468 |
| 71 | Same as above | NH$_2$(CH$_2$)$_2$-N(CH$_2$CH$_2$)$_2$CH$_2$CH$_2$ | Same as above | (structure) | [2] 207.5–208 | 378 | 468 |
| 72 | do | NH$_2$(CH$_2$)$_2$-pyridine | (C$_2$H$_5$)$_2$SO$_4$ | (structure) | 207–209 | 378 | 468 |
| 73 | do | Same as above | H$_2$SO$_4$ | (structure) | 214–218 | 378 | 468 |
| 74 | do | do | HCl | (structure) | [2] 228 | 378 | 478 |
| 75 | do | do | (CH$_3$)$_2$SO$_4$ | (structure) | 207–210 | 378 | 468 |
| 76 | do | do | CH$_3$-⌬-SO$_3$C$_2$H$_5$ | (structure) | [3] | 378 | 468 |

| Ex. No. | Alkylating agent | Amine compound as represented by formula (2), (3) or (4) | Quaternizing agent or acidic compound | Product | Melting point (°C.) | Ultraviolet adsorption maximum wavelength (mμ, water) | Fluorescence maximum wavelength, Fl$_{max}$ (mμ, water, xenon, 365 mμ) |
|---|---|---|---|---|---|---|---|
| 77 | $(C_2H_5)_2SO_4$ | do | $(CH_3)_2SO_4$ | | 202–204 | 381 | 471 |
| 78 | $(CH_3)_2SO_4$ | | $CH_3\text{-}C_6H_4\text{-}SO_3CH_3$ | | 198–199 | 378 | 467 |
| 79 | Same as above | | $NH_4Cl$ | | ²238.5 | 378 | 468 |
| 80 | do | | $C_2H_5I$ | | ²223.5–224.5 | 378 | 468 |
| 81 | do | | HCl | | ²217–219 | 378 | 468 |
| 82 | do | Same as above | $C_6H_5CH_2Cl$ | | 201.5–203 | 379 | 468 |
| 83 | do | do | $CH_3SO_2Cl$ | | ²213.5–215 | 378 | 468 |
| 84 | do | do | $(CH_3)_2SO_4$ | | 205–206 | 378 | 468 |

EXAMPLE 87

0.4 part of the compound prepared in example 68 is dissolved in 3,000 parts of water, and 5 parts of sodium hypochlorite, 2.5 parts of chlorous dioxide gas generation inhibitor and 5 parts of acetic acid are thereto added. One hundred parts of polyacrylonitrile fabrics are dipped in the resulting bath at 70° C., heated to 100° in 20 minutes, treated for 1 hour at this temperature and then cooled to 70° C. After the dechlorination treatment with an aqueous sodium bisulfite solution at 70° C. for 20 minutes, the fabrics are washed with water and dried, whereby whitened fabrics having a very high light fastness are obtained.

Even if the compound prepared in examples 9, 10, 26, 27 or 67 is used in place of the compound as prepared in example 68, whitened fabrics having a very high light fastness can be likewise obtained.

EXAMPLE 88

0.2 part of the compound as prepared in example 1 is dissolved in 3,000 parts of water, and 5 parts of formaldehyde sodium sulfoxylate and 5 parts of acetic acid are thereto added. A mixed spun cloth of polyacrylonitrile-wool (50:50) is dipped in the resulting bath at 60° C., heated to 96° C. in 20 minutes, treated at this temperature for 40 minutes, cooled to 70° C., washed with water and dried, whereby the clearly whitened cloth is obtained.

Even if compounds as represented by the following formulas are used in place of the compound as represented by the formula 15, clearly whitened cloth can be likewise obtained.

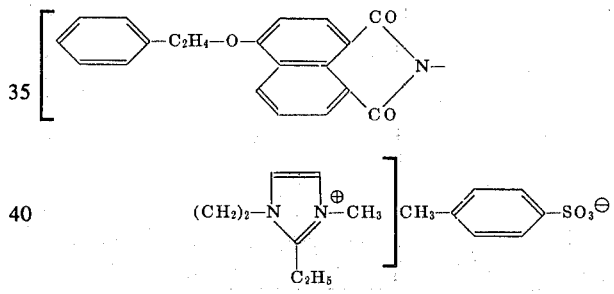

($\lambda_{max}$: 380 m$\mu$; Fl$_{max}$: 484 m$\mu$)

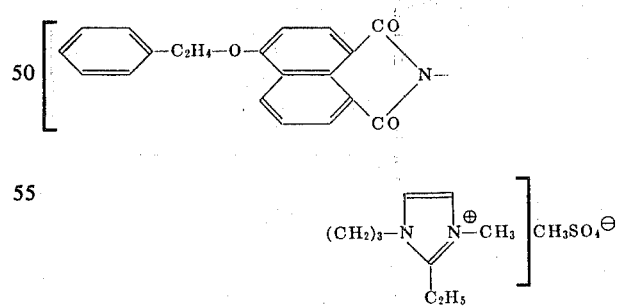

($\lambda_{max}$: 380 m$\mu$; Fl$_{max}$: 484 m$\mu$)

EXAMPLE 89

Thirty parts of acrylonitrile polymer are dissolved in 100 parts of dimethylformamide at 90° C., and 0.1 part of the compound as represented by the formula 18 is thereto added. The thus prepared spinning solution is extruded from spinning nozzles into 100 parts of water and coagulated at 20°–30° C. Then, the coagulated filaments are stretched five times as long as 80° C., washed with water, treated with a textile auxiliary agent, and dried, whereby fluorescently whitened, clearly white polyacrylonitrile filaments are obtained.

Even if the compounds having the following formulas are used in place of the compound as represented by the formula 18, the similar result can be obtained.

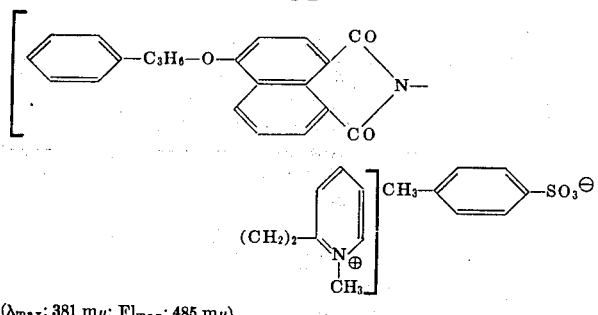

($\lambda_{max}$: 381 m$\mu$; Fl$_{max}$: 485 m$\mu$)

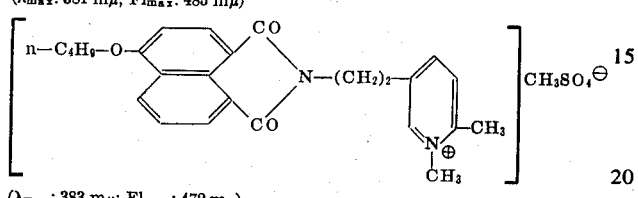

($\lambda_{max}$: 383 m$\mu$; Fl$_{max}$: 472 m$\mu$)

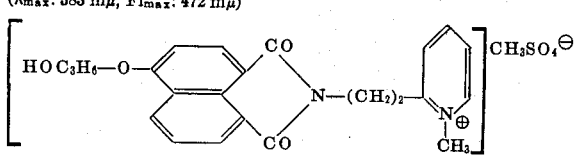

($\lambda_{max}$: 380 m$\mu$; Fl$_{max}$: 470 m$\mu$)

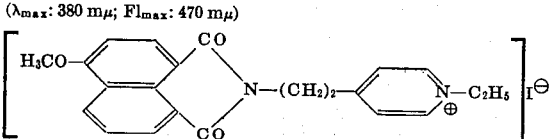

($\lambda_{max}$: 378 m$\mu$; Fl$_{max}$: 467m$\mu$)

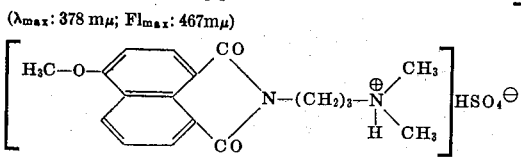

EXAMPLE 90

Ten parts of acrylonitrile polymer and 0.04 part of the compound prepared in example 5 are dissolved in 100 parts of dimethylformamide at 90° C. A proper amount of the resulting solution is poured onto a glass plate to form a film by means of an applicator, and then dipped into water immediately to deposit the resin. The thus obtained film is then dipped into hot water at 60° C. to sufficiently remove the solvent, washed with water and dried, whereby a fluorescently whitened, clearly white film of polyacrylonitrile polymer is obtained.

The heat resistance in organic solvent of the compound used in this example is very excellent.

EXAMPLE 91

0.4 part of the compound prepared in example 2 is dissolved into 3,000 parts of water, and 100 parts of acetate cloth are dipped into the thus prepared bath, heated to 85° C. in 20 minutes, treated at this temperature for 45 minutes, washed with water and dried, whereby clearly whitened cloth is obtained.

Even if a compound as represented by the following formula,

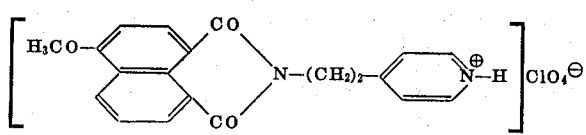

is used in place of the compound used in this example, clearly whitened cloth can be likewise obtained.

EXAMPLE 92

0.4 part of the compound is dissolved in 3,000 parts of water. 100 parts of vinylon cloth are dipped into the thus prepared bath, heated to 90° C. in 20 minutes, treated at that temperature for 1 hour, washed with water, and dried, whereby clearly whitened cloth is obtained.

EXAMPLE 93

Two aqueous bleach baths are prepared separately according to the following formulations for the purpose of comparison:

(a) The conventional bath:
4-methoxynaphthalic methylimide, percentage on
the weight of fiber 0.4%
Bath ratio 1:30
(b) The present bath:

A compound as represented by the general formula 1, where $R_1$: —$CH_3$, $n$: 3, X: $N\begin{smallmatrix}CH_3\\-CH_3\\C_2H_5\end{smallmatrix}$, Y: $C_2H_5SO_4$, percentage on the weight of fibers 0.4%
Bath ratio 1:30

The thus prepared bathes are adjusted to a pH of 3 by adding thereto acetic acid. Polyacrylonitrile fibers are dipped in these bathes respectively. When the bathes are maintained at 90° C. for 60 minutes, adsorption of whitening agent reaches an equilibrium.

Percentage equilibrium adsorption is calculated as a ratio of optical density of original bath to that of the bath after treatment. The percentage equilibrium adsorption for these two bathes are shown below:

| Bath | Percentage equilibrium adsorption |
|---|---|
| a | 41.8% |
| b | 94.1% |

EXAMPLE 94

Two aqueous bleaching bathes are prepared separately according to the following formulations for the purpose of comparison:

(a) Conventional bath:
4-methoxynaphthalic methylimide, percentage on
the weight of fibers 0.4 or 0.5%
Sodium hypochlorite, percentage on
the weight of fibers 10%
Chlorous dioxide gas generation inhibitor,
percentage on the weight of fibers 5%
Bath ratio 1:30
(b) Present bath:

The compound as represented by the general formula (1), wherein $R_1$: —$CH_3$, $n$: 3, X: $N\begin{smallmatrix}CH_3\\-CH_3\\C_2H_5\end{smallmatrix}$, and Y: $C_2H_5SO_4$, percentage on the weight of fibers 0.4 or 0.5%
Sodium hypochlorite, percentage on
the weight of fibers 10%
Chlorous dioxide gas inhibitor, percentage on
the weight of fibers 5%
Bath ratio 1:30

The thus prepared bathes are adjusted to a pH of 3.0 by adding thereto acetic acid. Polyacrylonitrile spun fabrics are dipped separately into these bathes at 50°–60° C. The bath temperature is raised up to 98°–100° C. for 40 minutes and then gradually cooled down to 70° C.

The treated fabrics are washed with water, treated with an aqueous sodium bisulfite solution (1 g./l.) at 60°–70° C. for 10 minutes and then washed with water. In this manner, the whitening (optical brightening) and chemical bleaching treatments are effected simultaneously.

The thus treated fabrics have the following whiteness:
1. Z value is a mean value of 4 values measured.
   ΔZ = (Z-value of treated fabrics) - (Z-value of nontreated fabrics)

|  | 4-methoxy-naphthalic methylimide | | Compound as represented by the general formula: $CH_3$ $(R_1: CH_2, n:3, X:N—CH_3$ $C_2H_5$ and $Y: C_2H_5SO_4)$ | |
|---|---|---|---|---|
| Item | Z value | ΔZ value | Z value | ΔZ value |
| Concentration (O.W.F.): | | | | |
| Non-treated fabrics | 98.4 | | 98.4 | |
| 0.4% | 141.35 | 42.95 | 142.7 | 44.3 |
| 0.5% | 142.0 | 43.6 | 143.5 | 45.1 |

2. Hunter—L, a, b system $$\Delta E = \{(\Delta a)^2 + (\Delta b)^2 + (\Delta L)^2\}^{1/2}$$
(a mean value of 4 values measured)

|  | 4-methoxy-naphthalic methylimide | | | | Compound as represented by the general formula: $CH_3$ $(R_1: CH_3, n:3, X:N—CH_3$ $C_2H_5$ and $Y: C_2H_5SO_4)$ | | | |
|---|---|---|---|---|---|---|---|---|
| Item | L | a | b | ΔE | L | a | b | ΔE |
| Concentration (O.W.F.) | | | | | | | | |
| Non-treated fabrics | 94.6 | −1.6 | +5.1 |  | 94.6 | −1.6 | +5.1 | |
| 0.4% | 97.4 | +3.91 | −17.0 | 12.2 | 97.27 | +4.1 | −17.9 | 13.3 |
| 0.5% | 97.4 | +3.75 | −17.25 | 12.7 | 97.5 | +4.0 | +18.5 | 13.8 |

Measurement is carried out by means of a xenon automatic fluorescence color difference meter using the whitened fabrics after ironing the fabrics at 140°–145° C.

What is claimed is:
1. A compound as represented by the formula,

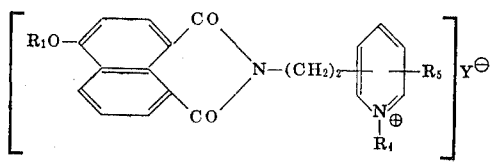

wherein $R_1$ is a lower alkyl group, a lower alkoxyethyl group, a phenylethyl group or a phenylpropyl group; $R_4$ is a hydrogen atom, a lower alkyl group or benzyl group; $R_5$ is a hydrogen atom or a lower alkyl group; and Y is a colorless anion.

2. The compound according to claim 1, wherein the compound is represented by the following formula:

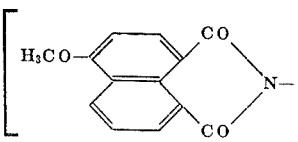

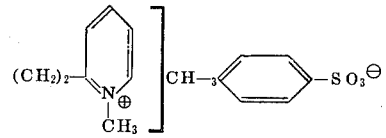

3. The compound according to claim 1, wherein the compound is represented by the following formula:

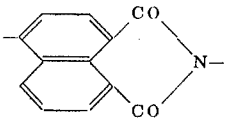

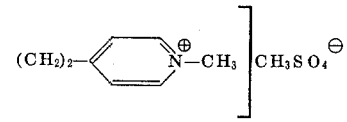

4. The compound according to claim 1, wherein the compound is represented by the following formula:

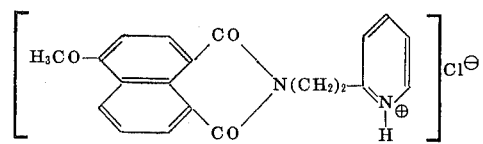

5. The compound according to claim 1, wherein the compound is represented by the following formula:

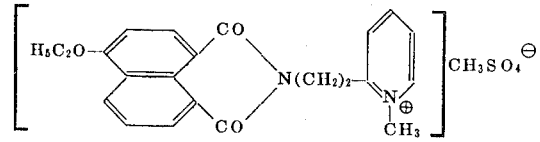

6. The compound according to claim 1, wherein the compound is represented by the following formula,

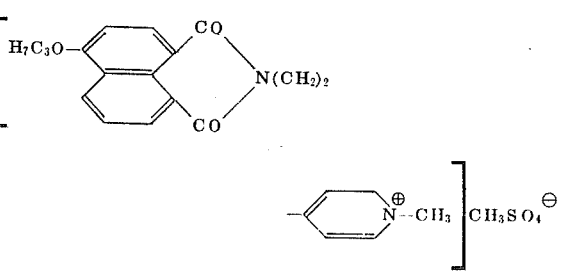

UNITED STATES PATENT OFFICE
CERTIFICATE OF CORRECTION

Patent No. 3,625,947                   Dated December 7, 1971

Inventor(s)  Tamehiko Noguchi et al

It is certified that error appears in the above-identified patent and that said Letters Patent are hereby corrected as shown below:

On the cover sheet [73] the assignee's name "Kabushiko" should read -- Kabushiki --; [32] under Priorities, "Jan. 30, 1957" should read -- Jan. 30, 1967 --; column 2, line 54, "$R_1 13OH8$" should read -- $R_1$     OH --; at the end of line 54, insert -- (8) --; column 12, Example 28, under Product. within the formula:

"$N(CH_2)_3 \overset{\ominus}{N}$ " the "$\ominus$" should be --⊕--;
column 19, figure 17, "OC" should read -- CO --; column 22, Figure 61, last column, "46" should read -- 468 --.

Signed and sealed this 26th day of December 1972.

(SEAL)
Attest:

EDWARD M. FLETCHER, JR.                    ROBERT GOTTSCHALK
Attesting Officer                          Commissioner of Patents